Jan. 30, 1968
W. F. BROSKE
3,366,334
RAIL BONDING CONNECTOR
Filed Nov. 7, 1966
2 Sheets-Sheet 1
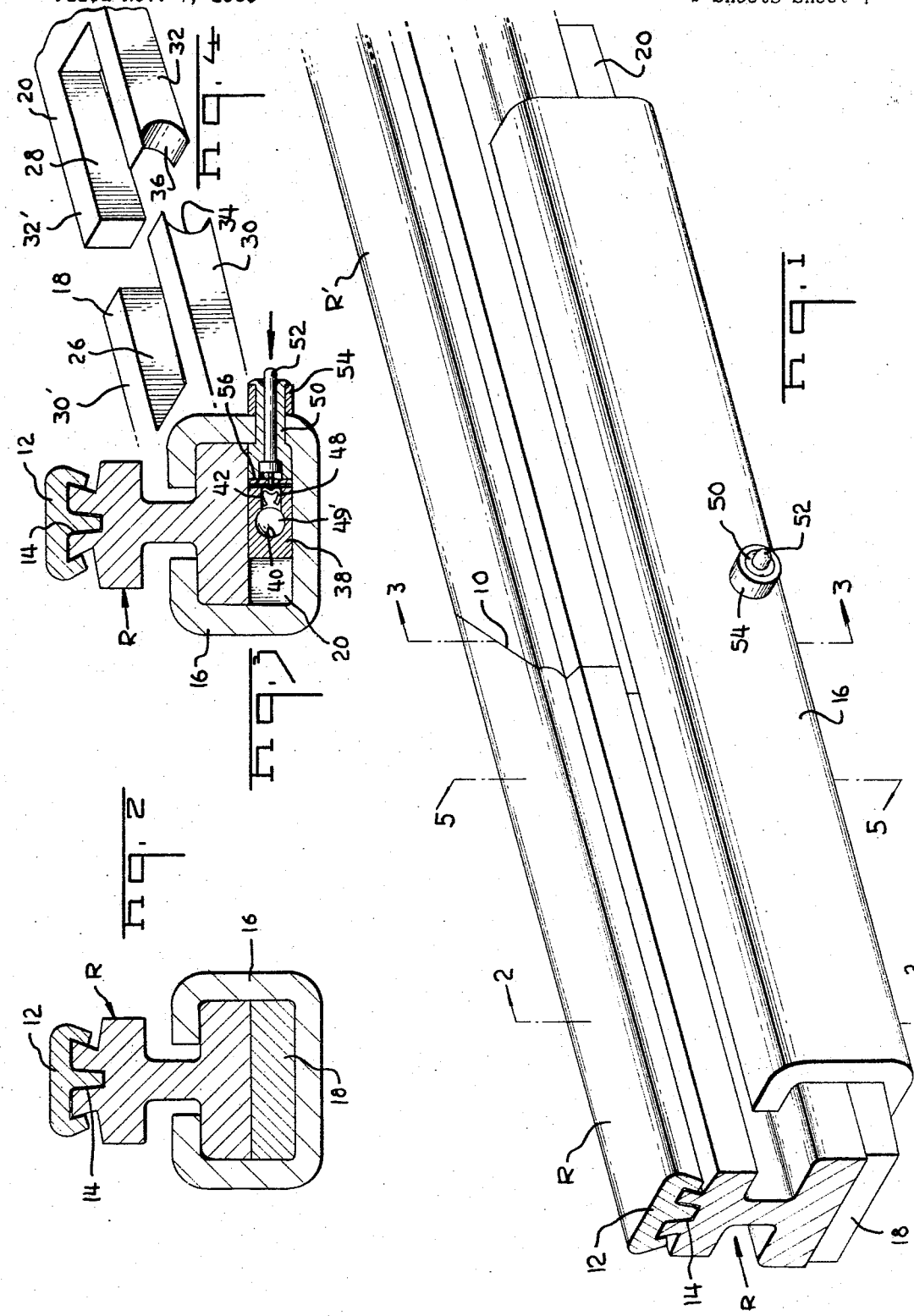

Jan. 30, 1968 W. F. BROSKE 3,366,334
RAIL BONDING CONNECTOR
Filed Nov. 7, 1966 2 Sheets-Sheet 2
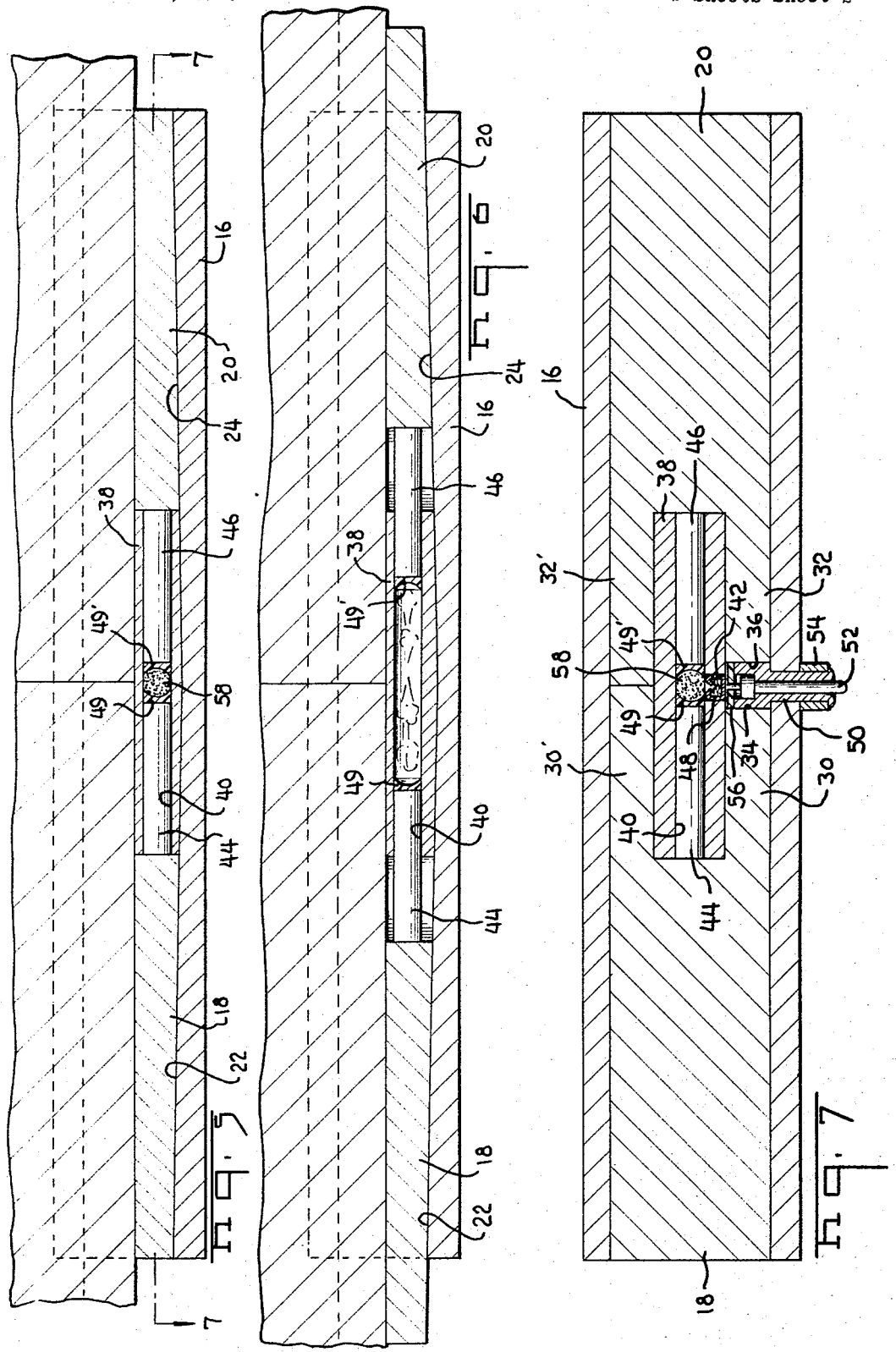

United States Patent Office 3,366,334
Patented Jan. 30, 1968

3,366,334
RAIL BONDING CONNECTOR
William F. Broske, Camp Hill, Pa., assignor to AMP Incorporated, Harrisburg, Pa.
Filed Nov. 7, 1966, Ser. No. 592,396
5 Claims. (Cl. 238—151)

This invention relates to a technique for bonding rail joints by the use of explosively-operated, tapered wedge connectors. In the use of 3-phase, alternating current conductors, the current is carried by stainless steel, capped-aluminum rails which are formed in 30-foot sections. It is necessary to join these rails in such a manner as to promote conductivity, while maintaining a good mechanical joint. The joint must withstand cyclic temperatures, as well as vibrations demanded in a joint of this type.

It is an object of this invention to provide a connector for bonding rail joints, which connector may be applied by the detonation of an explosive charge contained within the connector.

It is a further object of this invention to provide such a connector whereby a pair of tapered wedges are driven outwardly by the explosive charge contained in the connector.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

In the drawings:

FIGURE 1 is a perspective view of the device as used in connecting a pair of rails;

FIGURE 2 is a sectional view taken through plane 2—2 of FIGURE 1;

FIGURE 3 is a sectional view taken through plane 3—3 of FIGURE 1, illustrating the detonating mechanism;

FIGURE 4 is a broken-away section of the wedge members;

FIGURE 5 is a sectional view taken through plane 5—5 of FIGURE 1, illustrating the device before detonation;

FIGURE 6 is a view similar to FIGURE 5, showing the device during detonation; and FIGURE 7 is a view taken through plane 7—7 of FIGURE 3.

As shown in FIGURE 1, a pair of rails, generally designated R and R', are cut at a 45° angle along joint 10. The rails are generally I-shaped in cross-section (FIGURE 2). They are commonly made of aluminum and have a press-fit cap 12 of stainless steel. A silver-filled, epoxy resin 14 coats the innerface between the I-shaped rail and the cap.

The connector device includes an outer C-shaped clamp 16 (FIGURE 3). A pair of tapered wedges 18 and 20 (FIGURE 5) fit within the bight of the C-shaped member 16. The inside surfaces 22 and 24 of the back of the C-shaped member taper inwardly to a degree which matches the taper on the bottom surfaces of the wedges 18 and 20.

The wedges 18 and 20 are slotted (FIGURE 4) at their inner ends to form cut-away portions 26 and 28. These cut-away portions form arms 30 and 30' on the wedge 18, and arms 32, 32' on the wedge 20. The arm 30 has an arcuate section 34 formed at its inner end which matches arcuate section 36 formed on the inner end of arm 32.

A wedge-actuating member 38 (FIGURE 7) fits into the slot formed by the cut-away portions 26 and 28. The wedge-actuating member is generally rectangular with a longitudinal opening 40 (FIGURE 3) formed along its central axis. One side of the wedge-actuating member has a port 42. Pistons 44, 46 fit into the opening 40. A primer cap is disposed in the port 42 with a friction-fit. A pair of seals 49, 49' are disposed in the opening 40 adjacent the inner ends of the pistons.

A detonating member (FIGURE 3) is disposed in one side of the C-clamp 16. The detonating member includes a chamber 50 which extends through the side of the C-clamp. A firing pin 52 is slidably mounted in the chamber 50. An annular ring 54 surrounds the chamber 50 to retain the chamber in the clamp, and an annular ring 56 is secured to the other end of the chamber 50 to retain the firing pin in the chamber.

When it is desired to bond a pair of rails R, R' together, the connector is first assembled. A powder charge 58 (FIGURE 7) is placed centrally of the opening 40 in the wedge-actuated member 38 and held in place by seals 49, 49'. The pistons 44 and 46 are inserted into the ends of the wedge-actuating member 38, and the primer 48 fits into the port 42. The wedge-actuating member 38 is slightly tapered at its central, bottom surface (FIGURE 6) to fit into the tapered bottom surface of the clamp 16. The wedge-actuated member 38 is inserted into the clamp 16 with the primer adjacent the firing pin 42 (FIGURE 7). The tapered wedges 18 and 20 are inserted from either end so that the member 38 fits within the slots 26 and 28 in the respective wedges. The firing pin fits into the arcuate portion defined by the surfaces 34 and 36, and permits the firing pin to be stationed adjacent the primer 48.

The entire connector is slipped onto the base of one of the rails and the opposing rail is then fed into the clamp 16 until the edges of the joint 10 match. With the rails thus positioned, firing pin 52 is actuated by a sharp blow. Detonation of the primer 48 causes the explosive charge 58 to drive the pistons 44 and 46 outwardly (FIGURE 6).

Outward motion of the pistons 44 and 46 drives the tapered wedges 18 and 20 outwardly to tighten the connection between the clamp 16 and each of the rails. The increase in thickness of the wedge member against tapered surfaces 22 and 24 cause a tight joint between the clamp and each of the rails to be affected.

It is thus observed that a very simple connection is made between the clamp and the rails without the use of special tooling. The connection is capable of good electrical conduction because the action of the wedges, moving outwardly, cleans the contact surfaces. Additionally, the driving of the wedges outwardly causes a strong mechanical joint capable of withstanding vibration and temperature cycling.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

What is claimed is:

1. In a device for joining rails, a C-shaped member adapted to engage portions of the rails to be joined, wedge means disposed adjacent the inside surface of the C-shaped member adapted to be driven longitudinally to join the rails in the C-shaped member, and explosive means adapted to drive the wedge means into rail-joining position.

2. The device of claim 1 wherein the explosive means is located within the device.

3. The device of claim 1 wherein the wedge means comprises a pair of tapered members, and the explosive means comprises a wedge-driving member disposed between the tapered members.

4. The device of claim 3 wherein the wedge-driving member includes a pair of pistons movable to drive said tapered members into rail-joining position, an explosive charge actuatable to move said pistons and means for detonating said explosive charge.

5. The device of claim 4 wherein the pistons are coaxial and the explosive charge is located between the inner ends of the pistons, whereby detonation of the explosive charge simultaneously drives both pistons to force the tapered members into rail-joining position.

References Cited

UNITED STATES PATENTS

| 1,589,932 | 6/1926 | Bloss | 238—265 |
| 1,979,533 | 11/1934 | Dupuy | 238—151 |
| 2,657,863 | 11/1953 | Barrett | 238—164 |

JOSEPH R. LECLAIR, *Primary Examiner.*

ARTHUR L. LA POINT, *Examiner.*

R. A. BERTSCH, *Assistant Examiner.*